(No Model.)

S. E. LANDIS.
MACHINE BELT FASTENER.

No. 346,113. Patented July 27, 1886.

Attest
E. M. Breckinreed
J. L. Maguire

Inventor
Samuel E. Landis
By his atty

UNITED STATES PATENT OFFICE.

SAMUEL E. LANDIS, OF PHILADELPHIA, PENNSYLVANIA.

MACHINE-BELT FASTENER.

SPECIFICATION forming part of Letters Patent No. 346,113, dated July 27, 1886.

Application filed February 13, 1886. Serial No. 191,848. (No model.)

*To all whom it may concern:*

Be it known that I, SAMUEL E. LANDIS, of the city and county of Philadelphia, and State of Pennsylvania, have invented an Improvement in Machine-Belt Fasteners, of which the following is a specification.

My invention has reference to machine-belt fasteners; and it consists in certain improvements fully set forth in the following specification, and shown in the accompanying drawings, which form part thereof.

Machine-belts have had their ends united either by lacing or by means of metallic fasteners or plates; but where metallic fasteners are used it has been impossible to take up the excess in the length of the belt due to stretching after the belt has been in use a short time without cutting off a part of the belt and once more riveting or securing the fastener rigidly in place. This is expensive, annoying, and unsatisfactory.

My invention is intended as an improvement upon such fasteners, whereby the excess of belt after stretching may be easily cut off, the removable sections removed, and the ends of the belt recoupled. This result I accomplish by certain improvements upon the present known couplings, notably in the position in which they were originally attached to the belt.

Heretofore the ends of the belt have been united directly together, or each end has been attached to some separate and independent coupling-piece; but the couplings have been placed at the ends of the belting. Now, by placing one of these couplings at some distance from the end of the belt, and the other directly at the end, or both at some distance from the ends, and then uniting these two by an extra inserted coupling, I obtain a continuous belt, and after stretching the intervening section of belt is cut off and its extra coupling is removed, and the ends of the belt united directly together, and the excess of belt cut off. In some cases only one removable section would be used while in other cases two or more would be used, the number of said removable sections being immaterial to my invention.

Figure 1:
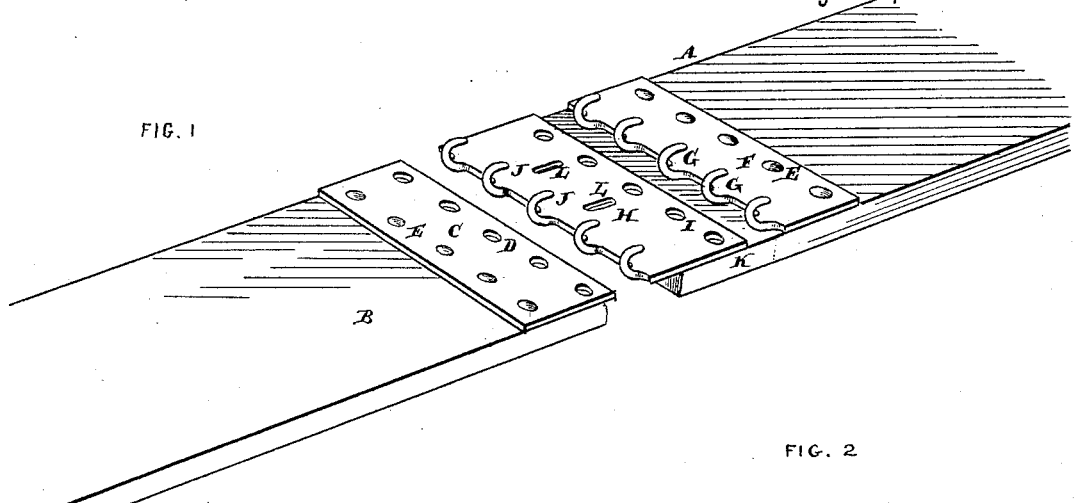
Figure 2:
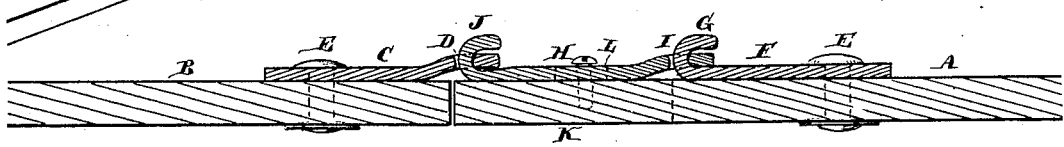

In the drawings, Figure 1 is a perspective view of a belt-fastener embodying my invention. Fig. 2 is a longitudinal section of same.

The plates are preferably placed upon the outer face of the belt, so as not to run in direct contact with the hand-wheel, and the hooks should project away from the belt.

H represents one of the removable plates or sections, and is one or several inches in length, and on one edge is provided with hooks J to couple with plate C, and near to the other edge with holes or apertures I for the hooks G of the plate F. When the belt is first put on it is cut so that the ends will just touch when the plates are coupled together. The part marked K, being the excess or the length which will have to be cut off after the belt has stretched, is substantially equal in length to the plate or plates H which are to be removed. By this means there is no gap between the ends of the belt at any time. After the belt has sufficiently stretched, the section H is removed, the part K of the belt cut off, and the plate F is directly coupled with the plate C, bringing the tautness of the belt to the requisite degree.

The removable plate may have slots L through which pins, screws, or rivets pass to loosely hold the plate to the belt, and yet admit of sufficient play in going around pulleys. By this means it could not accidentally work off.

By the use of this coupling it is seen that the coupling-plates once applied to the belt do not require to be removed or placed upon any other portion of same in taking up the slack.

Having now described my invention, what I claim as new, and desire to secure by Letters Patent, is—

1. In a machine-belt coupling, one belt end provided on its extremity with a metallic coupling-plate, in combination with the other belt end provided at a short distance from its extremity with a second coupling-plate, and an intermediate and removable coupling-plate equal in length to that part of the belt between its end and coupling, the said coupling-plates being adapted to be coupled together by means of hooks or catches and holes formed thereon, and in which the intermediate coupling-plate may be removed and the free end of the belt cut off when the belt has stretched sufficiently, and the two coupling-plates secured to the ends, then directly coupled together.

2. The combination of the belt ends B and A K, the coupling-plates C F, secured respectively thereto, one of which has holes D near its edge, and the other of which has hooks or catches G, and a removable coupling-plate, H, having both holes and hooks or catches to couple with plates C and F, the part K of the belt being equal to the length of the section H and independent thereof, substantially as and for the purpose specified.

In testimony of which invention I hereunto set my hand.

SAML. E. LANDIS.

Witnesses:
R. M. HUNTER,
CHARLES W. SPARHAWK.